April 17, 1962   H. MAHÉO   3,029,785
DEVICE FOR COLLECTING OYSTER SEED
Filed June 24, 1958   3 Sheets-Sheet 1
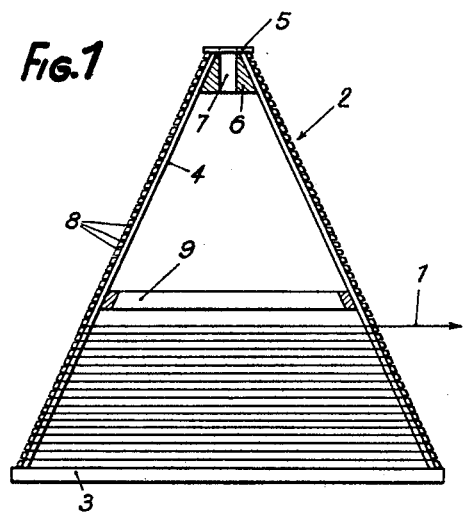
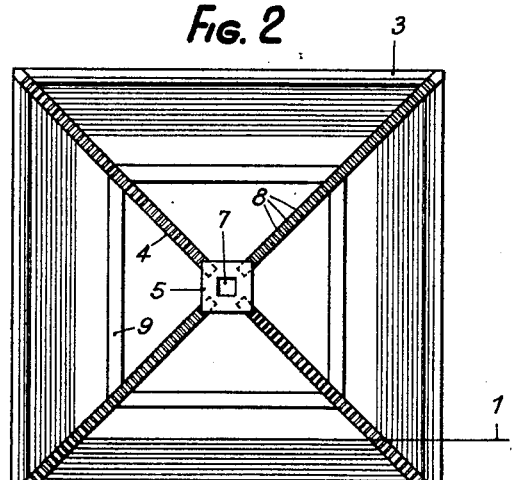
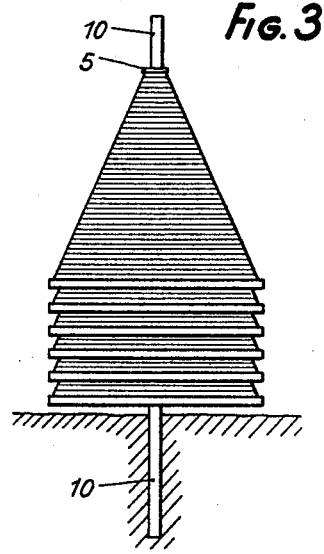
Inventor
Henri Mahéo
by Michael S. Strike
Attorney April 17, 1962 H. MAHÉO 3,029,785
DEVICE FOR COLLECTING OYSTER SEED
Filed June 24, 1958 3 Sheets-Sheet 2
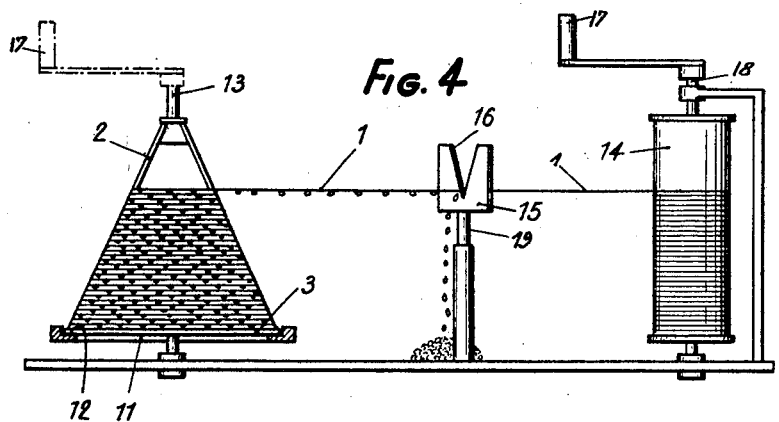
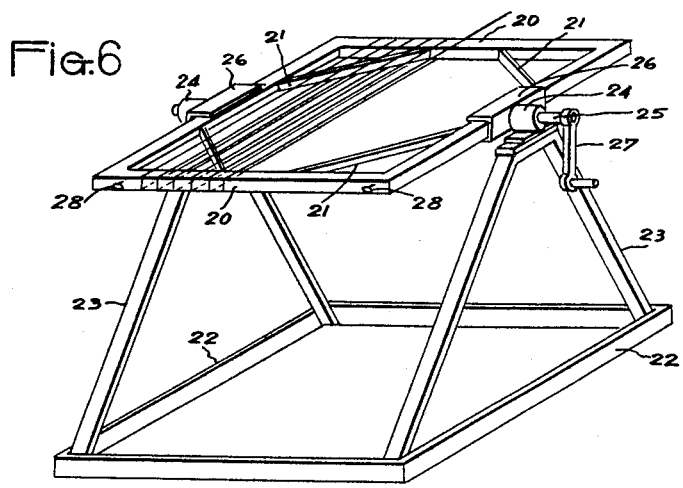

April 17, 1962  H. MAHÉO  3,029,785
DEVICE FOR COLLECTING OYSTER SEED
Filed June 24, 1958  3 Sheets-Sheet 3
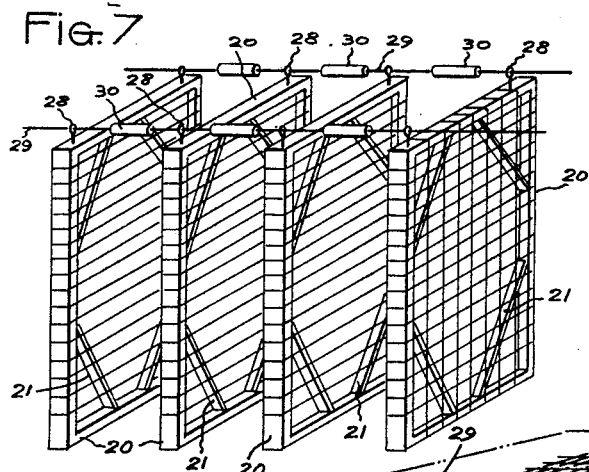
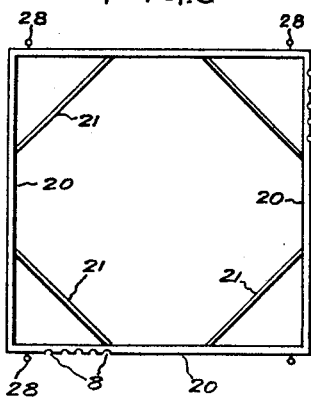
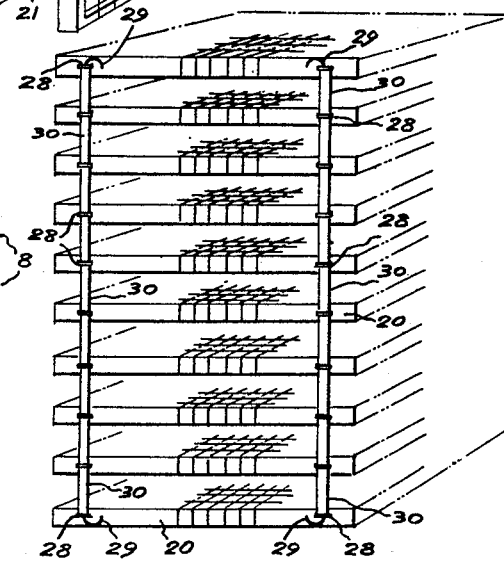

United States Patent Office 3,029,785
Patented Apr. 17, 1962

3,029,785
DEVICE FOR COLLECTING OYSTER SEED
Henri Mahéo, Cotes-du-Nord, Lezardrieux, France
Filed June 24, 1958, Ser. No. 744,119
Claims priority, application France July 1, 1957
10 Claims. (Cl. 119—4)

The devices generally used to collect oyster seed have several disadvantages which limit their efficiency. The use of fascines has been practically abandoned in favour of collectors consisting in tiles coated with limewash. These tiles, stacked in different ways require, due to their consideratble weight, a tedious and slow labour, when laying or collecting. The alluvia and the silt deposit easily on their surface, and their limited "aeration" does not allow the natural motions of the water to clear them as they get fouled, which has for effect to limit the duration of the collecting period, as the oyster seed does not stick to muddened tiles. On the other hand, the oyster seed's collecting itself is entirely effected by hand, by means of several tools, such as, for instance, the loose prying knife, with a long and boring operation which provokes the destruction of many young oysters.

The hereby described invention intends to overdo these discrepancies. It concerns a device essentially constituted by a spiraled coiling of string or any analogous material, fitted on a frame made out of wood or any other suitable material. Such a collecting unit has an increased "aeration," no dead areas, and a very great working surface for collection, thus promoting a greater efficiency and lengthening the collecting period. The collecting elements completed in the above described manner are still and according to the invention of such a shape that they can be easily piled up, for instance pyramidal, this particular structure having decisive building advantages.

To pick the collected oyster seed up, and according to an important characteristic of the invention, it will only be necessary to uncoil the string loaded with oyster seed and drive it through a die which shall stop the oyster seed which will pile up in front of the die. By rewinding the string on the frame, the collecting unit is in working condition again. Its use is therefore endless.

Two ways of completing the object of the invention, given as an illustrating example, are very schematically shown on the herewith added figures, where:

FIGURE 1 represents a pyramidal collector shown in a vertical cut and partly fitted with string.

FIGURE 2 is a plan view of the same.

FIGURE 3 shows several pyramidal collectors piled up above each other, for use.

FIGURE 4 shows a possible project for building the winding unit used in connection with the pyramidal collectors described in the invention.

FIGURE 5 shows a second possible project for a collector in shape of a panel.

FIGURE 6 represents the winding unit used with such panels.

FIGURE 7 shows the means of assembly for such panels.

FIGURE 8 shows the finished assembly.

As FIGURES 1 and 2 properly show, the collector is constituted by a proper collecting element, made out of string 1 spirally coiled around a frame 2. This frame 2, of pyramidal shape in the selected example, has a quadrangular basis 3 in shape of frame on which are fastened uprights 4 materializing the edges of the pyramid, which is cut at its top in order to receive a terminal part constituted by a protruding end plate, associated with a block 6 both bored by an opening 7 preferentially of square shape. The uprights are fastened to this end plate by their upper ends.

All along the uprights 4 are tooled, at intervals of about ¼" notches, about ⁹⁄₁₆" deep and of a width corresponding to the diameter of the used string. These notches are intended to receive the successive turns of the string and to keep them regularly spaced.

In order to avoid the misshaping of the uprights 4 while winding the string 1, braces 9 can be fitted in order to provide the unit with a sufficient rigidity.

The thus constituted collecting element can be used alone after dipping in a solution of limewash, which will deposit in a uniform way on the string and stick to it in a durable way. It is advised to use a sisal string, for it fastens the limewash in the best manner.

However, according to the present invention, it is better to use such collectors in groups and therefore to pile-up the collectors, as can readily be seen of FIG. 3. Their form enables a nearly perfect fitting which is voluntarily limited by a block 6, in order to keep a sufficient distance between the corresponding walls of the collectors. A square section metallic bar 10 engages the openings 7 of the different collectors and binds them together. This bar is next dipped in the soil, in order to keep the collectors in place.

The high aeration of the collecting device according to the present invention allows, at low tide, to clean it with a water stream and to avoid the deposition of silt.

The winding of the string around the frame can be done as an example, with the device shown on FIG. 4. The frame 2 of the collecting element is mounted on the rotatable plate 11, the base being fit into a corresponding recess 12 of a corresponding form on the plate. A bar 13 of the same section as the aforesaid bar 10 engages the orifice 7 of the end piece and achieves the fixing of the element, this bar 13 being integral with the rotating plate 11. A reel 14 receives the string to be wound on the frame 2 and a guide (not shown) leads the string during its spiral winding. The driving can be done either manually or mechanically. The crank 17 used in this example has been illustrated with dotted lines.

The same device can also be used to gather the oyster seed after it has fixed itself on the string. The guiding device for the string is replaced by a die consisting in a metallic plate 15, mounted on a telescopic rod 19 and provided with a slot 16 in the form of a V. The device works in reverse way of winding, with the same crank 17 engaged with the axle 18 of the reel 14 and the oyster seed stopped and separated of the string 1 by the slot 16 can easily be gathered in a suitable manner.

It is evident that the invention is not limited to the described embodiment and that it is possible to alter the form of the collecting elements as well as the arrangement of the reel that completes them without departing from the scope of the invention.

FIGURE 5 illustrates as an alternative an embodiment of the invention as a collector in the form of a panel whose frame, designated by 20 can be reinforced at its corners by gussets or legs 21. The same slots 8 as on the edges 4 are provided on all the sides of the frame as in the first embodiment, in order to wind the string 1 with regularly spaced turns.

The frame 20 may be fitted with string in one direction or also may be wound in both directions as is represented on the right-hand panel of FIGURE 7.

This winding of the string on the frame can easily be done by using as an example the winding-unwinding reel illustrated by the FIG. 6 and consisting essentially in a base 22 supporting two uprights 23 terminating at their upper ends in a socket 24. In each of these sockets rotates freely an axle 25 integral with a supporting device 26 consisting in an element of channel-iron with the spacing of its flanges equal to the thickness of the frame 20. The uprights are sufficiently resilient to hold the frames 20 retained between the support holders 26 by friction. By means of the crank 27 fixed to the end of one of the axles 26, the frame can readily be turned to fit it with turns of string.

When the frame 20 is to be fitted with cross turns, it will be sufficient, after winding of the first layer of turns, to engage it again between the holders 26 after having turned it on 90° and to wind in the same way the second layer of turns.

The collecting panels realised in such a way can be used in stacks in a number of ten for example, each collector being separated of the following one with a distance approximately equal to its thickness as can readily be seen on FIG. 8.

For this stacking, the frames are provided with eyelets 28 with a wire 29 running through them, with tubular intermediate-pieces 30 of suitable length disposed between each collector in the manner represented by FIG. 7. The block thus built of readily and rapidly separable elements is used in the same conditions as it has been indicated above, preferably by laying it between posts dipped in the soil, and supporting a light floor to hold it at a certain distance above the ground.

What I claim is:

1. An oyster seed gathering device, comprising, in combination, a frame; and a string wound about said frame with end portions of said string fixed to said frame and intermediate portions thereof frictionally engaging string retaining means on said frame in a substantially parallel spaced relationship.

2. An oyster seed gathering device, comprising, in combination, a substantially pyramid-shaped frame including upwardly converging elongated frame portions defining edges of said pyramid; and a string wound about said frame portions with end portions of said string fixed to said frame and intermediate portions thereof frictionally engaging said edges of said pyramid in spaced substantially parallel relationship.

3. An oyster seed gathering device, comprising, in combination, a frame in the shape of a truncated pyramid including upwardly converging elognated frame portions defining edges of said pyramid; and a string wound about said frame portions with end portions of said string fixed to said frame and intermediate portions thereof frictionally engaging said edges of said pyramid in spaced substantially parallel relationship.

4. An oyster seed gathering device, comprising, in combination, a frame formed with outwardly facing slots; and a string wound about said frame with its end portions fixed to said frame and with its intermediate portions frictionally engaged in said slots so as to be held in spaced relationship.

5. An oyster seed gathering device, comprising, in combination, a frame formed with outwardly facing equidistant slots; and a string wound about said frame with its end portions fixed to said frame and with its intermediate portions frictionally engaged in said slots so as to be held in spaced relationship.

6. An oyster seed gathering device, comprising, in combination, a stack of oyster seed gathering members, each of said members including a frame in the shape of a truncated pyramid including upwardly converging elongated frame portions defining edges of said pyramid, and a string wound about said frame portions with end portions of said string fixed to said frame and intermediate portions thereof frictionally engaging said edges of said pyramid in spaced substantially parallel relationship so that said string may be unwound from said frame in a continuous operation, whereby oyster seeds collecting on said string may be stripped therefrom in a continuous operation during unwinding said string from said frame; and holding means for maintaining said members in stacked position with said frame portions of adjacent frames spaced from each other.

7. An oyster seed gathering device, comprising, in combination, a stack of oyster seed gathering members, each of said members including a frame in the shape of a truncated pyramid including upwardly converging elongated frame portions defining edges of said pyramid, and a string wound about said frame portions with end portions of said string fixed to said frame and intermediate portions thereof frictionally engaging said edges of said pyramid in spaced substantially parallel relationship so that said string may be unwound from said frame in a continuous operation, whereby oyster seeds collecting on said string may be stripped therefrom in a continuous operation during unwinding said string from said frame; and holding means including a holding bar extending coaxially with said stacked gathering members for maintaining said members in stacked position with said frame portions of adjacent frames spaced from each other.

8. An oyster seed gathering device, comprising, in combination, a panel-shaped frame; and a string wound about said frame with end portions of said string fixed to said frame and intermediate portions thereof frictionally engaging string retaining means on said frame in a substantially parallel spaced relationship.

9. An oyster seed gathering device, comprising, in combination, a rectangular panel-shaped frame having two pairs of parallel opposite frame portions; and a string wound about at least one of said pairs of parallel opposite frame portions of said frame with end portions of said string fixed to said frame and intermediate portions thereof frictionally engaging string retaining means on said frame in a substantially parallel spaced relationship.

10. An oyster seed gathering device, comprising, in combination, a row of panel-shaped frames arranged parallel and spaced from each other; a string wound about each one of said frames with end portions of said string fixed to said frame and intermediate portions thereof frictionally engaging string retaining means on said frame in a substantially parallel spaced relationship to be unwound during turning of said one frame; and means for maintaining said frames of said row of frames in parallel and spaced position.

References Cited in the file of this patent

UNITED STATES PATENTS

| | | |
|---|---|---|
| 345,832 | Clifton | July 20, 1886 |
| 1,695,761 | Hecker | Dec. 18, 1928 |
| 1,933,950 | Wells | Nov. 7, 1933 |
| 2,853,049 | Glancy | Sept. 23, 1958 |
| 2,922,393 | Munz | Jan. 26, 1960 |

FOREIGN PATENTS

| | | |
|---|---|---|
| 3,506 | Great Britain | Oct. 9, 1875 |
| 332,438 | France | Oct. 28, 1903 |
| 14911/28 | Australia | Sept. 6, 1929 |